United States Patent [19]
Thompson et al.

[11] Patent Number: 5,396,600
[45] Date of Patent: Mar. 7, 1995

[54] APPARATUS AND METHOD FOR INTERFACING BETWEEN PROCESSING COMPUTERS IN A COMPUTER SYSTEM

[75] Inventors: Roger D. Thompson, Woking; Ian Robertson, Wokingham; David F. McCabe, Camberley, all of Great Britain

[73] Assignee: International Computers Limited, London, United Kingdom

[21] Appl. No.: 961,513

[22] Filed: Oct. 15, 1992

[30] Foreign Application Priority Data

Dec. 10, 1991 [GB] United Kingdom ............ 9126289

[51] Int. Cl.$^6$ .............................................. G06F 13/00
[52] U.S. Cl. .............................. 395/325; 364/DIG. 1; 364/239.9; 364/225; 364/282.1
[58] Field of Search ..................... 395/325, 650; 364/DIG. 1 MS File

[56] References Cited

U.S. PATENT DOCUMENTS

| | | | |
|---|---|---|---|
| 5,097,533 | 3/1992 | Burger et al. | 364/DIG. 1 |
| 5,129,086 | 7/1992 | Coyle, Jr. et al. | 395/650 |
| 5,179,700 | 1/1993 | Aihara et al. | 395/650 |

OTHER PUBLICATIONS

Database WPIL, Week 9027, Derwent Publications, "Software Flow Controller Enabling Application Aleration by User . . . (etc)", vol. 314, No. 39, May 20,1990.
Buchwald, "Integrating Applications with SAA", IBM Systems Journal, vol. 27, No. 3, 1988, pp. 315–323.
Hartson, "User–Interface Management Control and Communication", IEEE Software, vol. 6, No. 3, May 1989, pp. 62–70.
Burgstaller, "On the Software Structure of User Interface Management Systems", Eurographics '89, Sep. 1989, pp. 75–86.

*Primary Examiner*—Thomas M. Heckler
*Attorney, Agent, or Firm*—Lee, Mann, Smith, McWilliams, Sweeney & Ohlson

[57] ABSTRACT

In a computer system, a dialog management system (DMS) provides a bridge between a business application, based on a linear processing model, and a human-computer interface (HCI) based on an event-driven processing model. The DMS comprises a set of inventories, which are used to gather and receive application parameters and HCI information asynchronously, to allow sets of data items to be assembled.

11 Claims, 3 Drawing Sheets

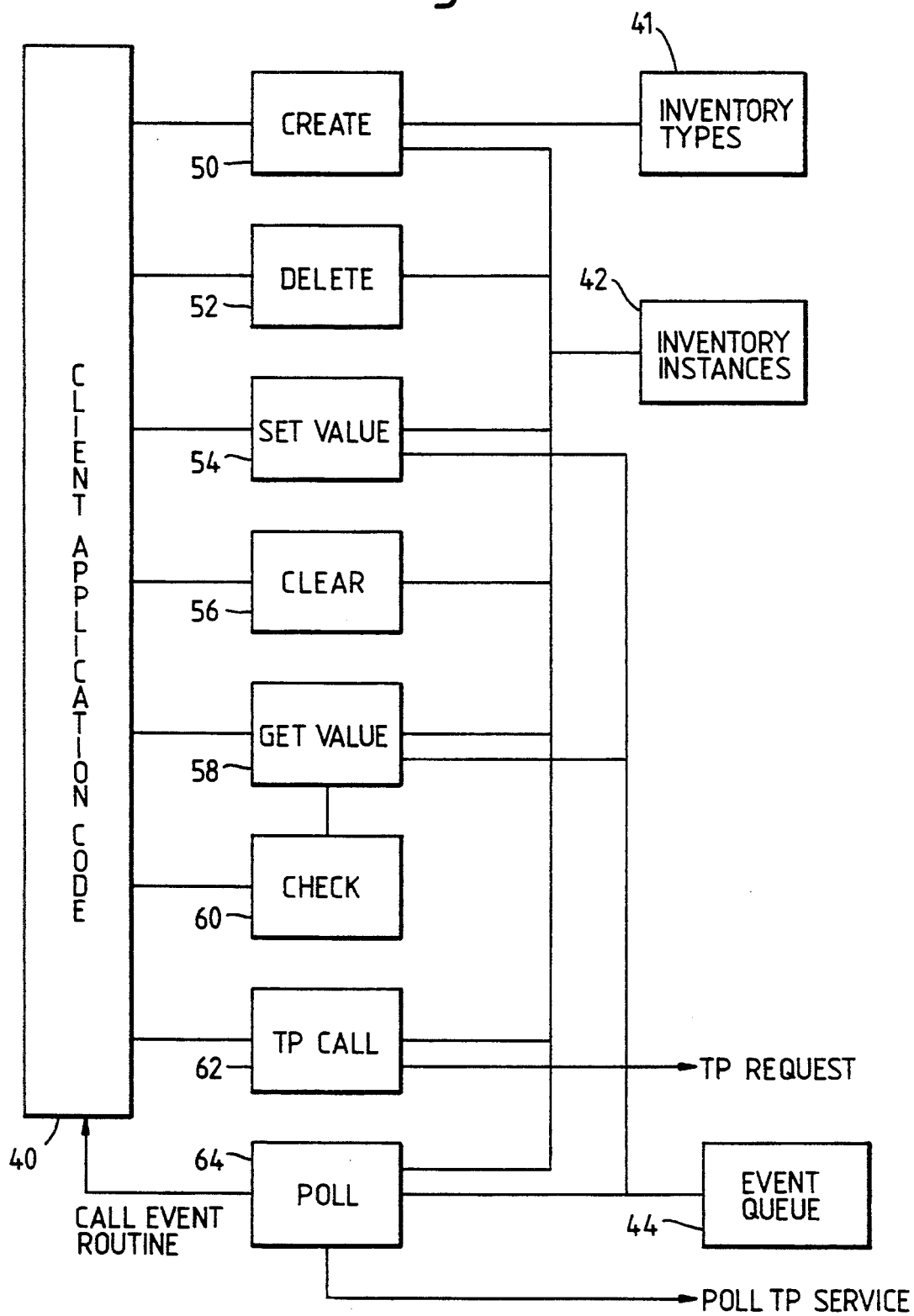

APPARATUS AND METHOD FOR INTERFACING BETWEEN PROCESSING COMPUTERS IN A COMPUTER SYSTEM

BACKGROUND TO THE INVENTION

This invention relates to computer systems. The invention is particularly, although not exclusively, concerned with a Human-Computer Interface (HCI); that is, to a mechanism for providing an interface between a computer system and a human user.

Most present day business applications use a linear flow processing model. The essential characteristic of design methodologies for such models is hierarchic decomposition. In other words, an application is decomposed into its major subsystems, which are in turn decomposed into smaller and smaller elements.

A consequence of the tools associated with this model is that the Human-Computer Interface (HCI) follows the same hierarchic decomposition. Typically, HCI screens reside at the lowest levels of the hierarchy, with menu selection used to navigate the various levels of the hierarchy. The number of alternative actions available at any point is therefore low, and there is usually only a single way of navigating between one point and another. There is also only a single context—it is not normally possible to leave a partially completed screen and return to it with the data left as it was.

Modern HCI tools, on the other hand, typically are based on an event driven processing model. The natural underlying design methodology is object oriented. Such HCIs are usually non-linear. In other words, the order in which actions are performed is not predetermined: leaving a partially completed screen in order to do something else, and returning to where it was left off is allowed for. Alternative navigation paths are also allowed for, and the number of choices at any particular point tends to be large.

Many companies are dissatisfied with the HCIs that are provided by their enterprise-wide applications, in which they have spent millions of pounds, particularly when applications costing a few hundred pounds, which exhibit the qualities of modern HCIs, abound on personal computers.

The object of the present invention is to provide a bridge between processing components based on a linear-flow processing model, and processing components based on non-linear processing models, such as object-oriented models.

SUMMARY OF THE INVENTION

According to the present invention there is provided a computer system comprising: a first processing component, a second processing component, and dialogue management means for providing an interface between the first and second components, wherein the dialogue management means comprises:

(a) means for maintaining at least one inventory, comprising a plurality of data items, (b) means for allowing the first and second components to update and access the data items in the inventory, and (c) means for checking the completeness of a set of data items in the inventory required by the first component to perform a particular processing operation.

The first processing component may be a business application operating on a linear processing model, while the second component may be an HCI component operating on an event-driven processing model, and it will be shown that the invention provides a bridge between such components.

BRIEF DESCRIPTION OF THE DRAWING

FIG. 4 is a block diagram showing a dialogue management system component in more detail.

DESCRIPTION OF AN EMBODIMENT OF THE INVENTION

One computer system embodying the invention will now be described by way of example with reference to the accompanying drawings.

Figure 1:
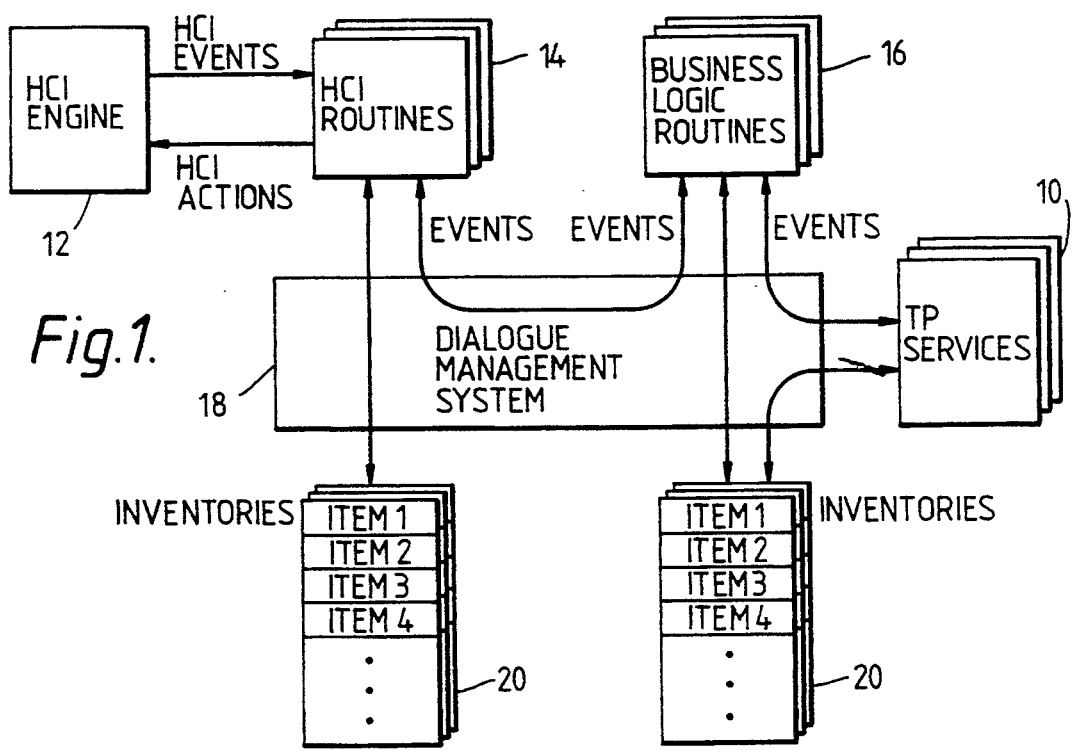
FIG. 1 is a block diagram showing the software components of a computer system in accordance with the invention.

Referring to FIG. 1, the system comprises one or more transaction processing (TP) services 10, an HCI engine 12, a set of HCI routines 14, a set of business logic routines 16, and a dialogue management system (DMS) 18.

The transaction processing services provide particular services to users. For example, a travel planning system may include TP services for checking the availability of and booking airline flights, and checking and booking hotel accommodation.

The business logic routines 16 implement a particular business service offered to the user, by integrating the available TP services and co-ordinating accesses to these services. For example, in the travel planning system referred to above, the business logic routines may include routines for automatically fetching hotel availability information for the destination of a specified flight.

The HCI engine 12 is a software component which provides the basic mechanisms for interaction with the user by way of a screen, keyboard and/or mouse. For example, the HCI engine may comprise the Windows software (Windows is a trademark of Microsoft Corp).

The HCI routines 14 are concerned with mapping the logical representation of the business service provided by the business logic routines 16 on to the interface presented by the HCI engine 12. For example, they may include routines for initiating actions to be performed when the mouse is "clicked" on a particular icon on the screen.

The exact nature and structure of the transaction processing services 10, HCI engine 12, HCI routines 14 and business logic routines 16, do not form any part of the present invention, and so it is not necessary to describe these in any further detail.

The dialogue management system (DMS) 18 provides a mechanism for communication and co-ordination between the HCI routines, business logic routines, and TP services. More specifically, the DMS maps the event-driven mechanisms of the HCI routines on to the linear flow model of the TP services. The DMS also facilitates the separation of the HCI routines from the business logic routines. This separation allows for maximum reusability of the business logic software.

The DMS 18 dynamically maintains a set of data structures referred to herein as inventories 20.

The inventories are used primarily by the client application code (i.e. the HCI routines and the business logic routines) to gather and receive TP service parameters and HCI information asynchronously. For example, a particular inventory may hold all the parameters required for a particular TP service call. The inventories thus provide a means for mapping the typically random data order resulting from event-driven HCI mechanisms on to the linear order required by the TP services. They also facilitate the separation of the client application code into an HCI component and a business logic component.

The DMS is provided with a number of predetermined inventory types, which act as templates for the creation of inventory instances when required by the client application code. Each inventory comprises a number of items, each of which consists of a reference to a data element or array of data elements.

Inventories can be created and deleted as required by the client application code, and at any given time each inventory type may have multiple instantiations. However, an inventory type may be specified as UNIQUE, which means that only one instance of that inventory may exist at any given time.

Each item can be in one of three states:
(i) Set. This indicates that the item has a value assigned to it.
(ii) Unset. This indicates that the item does not yet have a value assigned to it, or has been reset.
(iii) Pending. This indicates that the item is currently the subject of an asynchronous action, i.e. its value will be assigned on completion of the action. For example, the item may be the subject of a current TP action.

In addition, each item has five flags, referred to as the check flag, the notify event flag, the request event flag, the signal event flag, and the protected flag, the purpose of which is explained below.

The DMS maintains an event queue which consists of a chain of records, referred to herein as events. Each event is of one of the following types:
(i) Notify. This signifies that the state or value of an item has been changed, and specifies the event routine which should be called to deal with this. A notify event is generated only if the notify event flag of the item is ON. Where a group of items is expected to be updated together, for example by the data returned from a TP call, only one of the items needs to have its notify flag ON. This item will then act as a trigger for the whole group.
(ii) Request. This indicates that the value of an item has been requested but that item is currently in the unset state. For example, it may be that the item is waiting for a value to be supplied by an HCI routine or by a TP interaction. A request event is generated only if the request flag of the item in question is ON.
(iii) Signal. This is used to convey information relating to an item, without changing the value of the item. A signal event specifies a signal type which indicates the information to be conveyed. A signal event may be generated only if the signals event flag for the item in question is ON.

For example, a signal event may be generated as the result of a validity check on an item or set of items, in which case the signal type indicates whether or not the item is valid.
(iv) Create. This is used to signal the creation of an inventory, or a set of linked inventories.
(v) Delete. This signals the deletion of an inventory, or a set of linked inventories. An inventory may be defined as linked to a second inventory, so that when an instantiation of the first inventory is created or deleted, a create or delete event is generated for the second inventory.

The DMS allows the user code to declare an identity relationship between two items (normally in different inventories), indicating that both items refer to the same physical data element. If the inventory type is not UNIQUE, the identity relationship applies within each set of inventory instantiations with the same instance number. If, on the other hand, the inventory type is UNIQUE, the identity relationship applies only to the unique instance of that item. The event flags for items with relationships may be different.

The DMS also allows the user code to declare a "shadow" relationship between items, indicating that the items are related to each other without necessarily being identical. For example, such a relationship may be declared where one item is generated from another by the user code.

Figure 2:
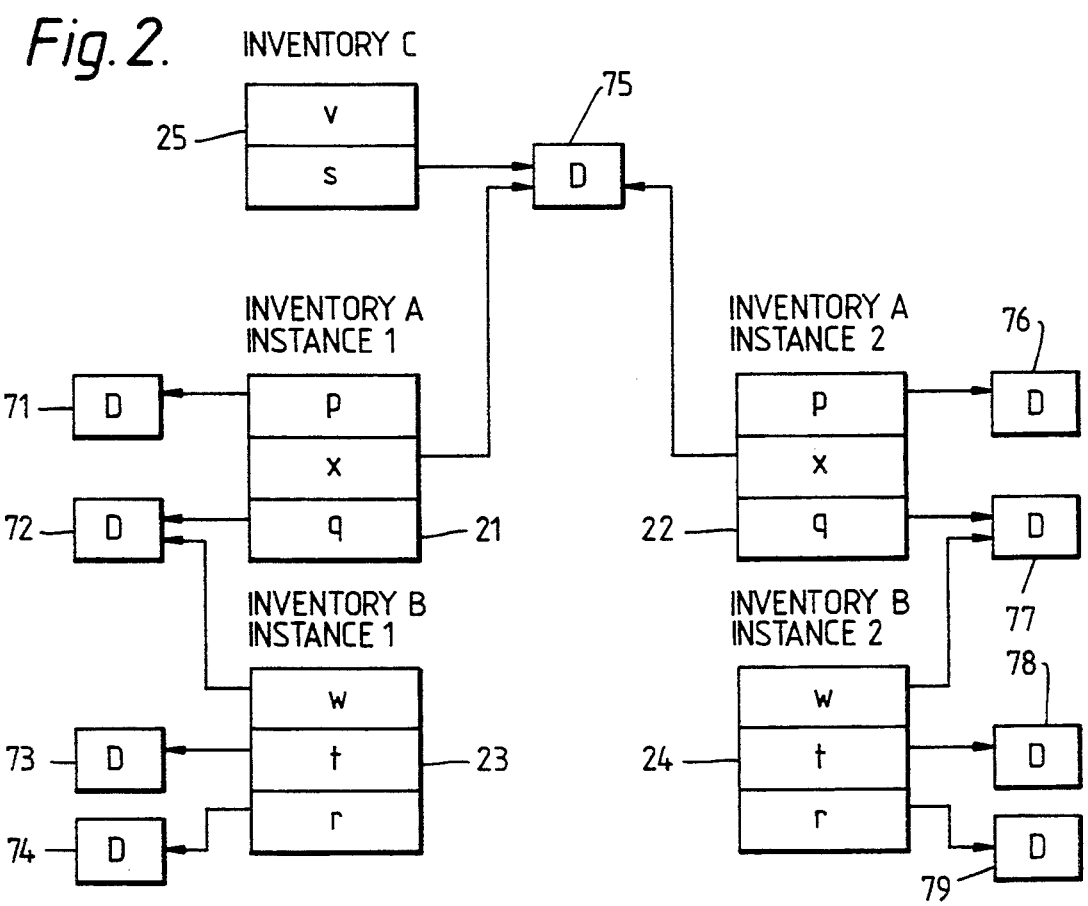
FIG. 2 is a schematic diagram illustrating inventories and relationships between items.

Referring to FIG. 2, this illustrates an example of a set of inventories 21–25 which reference a set of data elements (D) 71–79.

In this example, three inventory types A, B and C are provided. Types A and B are non-unique, while type C is declared as UNIQUE. Two instances (21, 22) of inventory A, two instances (23, 24) of inventory B, and one instance (25) of inventory C have been created as shown. Inventory A comprises items p, x and q, inventory B comprises items w, t and r and inventory C comprises items v and s.

It is assumed that, in this example, the following identity declarations have been made:
x IS s OF C
w IS q OF A This means that item x has an identity relationship with item s of inventory C, and item w has an identity relationship with item q of inventory A.

As shown in the drawing, items that are not the subject of any identity relationship (such as item p) are allocated separate data elements (71, 76) for each instantiation of the inventory i.e. they are local to the specific inventory instance.

In the case of the identity relationship between items w and q, since the inventory type A is not UNIQUE, this relationship applies within each instance of the inventories A and B. Thus, for example, it can be seen that items q and w in instance 1 of directories A and B share data element 72, while items q and w in instance 2 of these directories share a separate data element 77.

In the case of the identity relationship between items x and s, since the inventory type C is UNIQUE, this relationship applies only to the unique instance of item s. Thus, it can been seen that item s in inventory C shares the same data element 75 as item x in both instances (21, 22) of inventory A.

Where the HCI routines and business logic routines require to access the same set of parameters, these parameters may be stored in shared inventories, common to both the HCI and business logic routines. Preferably, however, in this situation the HCI routines and business logic routines are provided with separate instances of the inventories, and these instances are declared equivalent by forming equivalence relationships between all the items in the separate inventory instances. This enables separation of the HCI and business logic, and ensures maximum reusability of the business logic code, insulating it from changes in the HCI logic.

Figure 3:
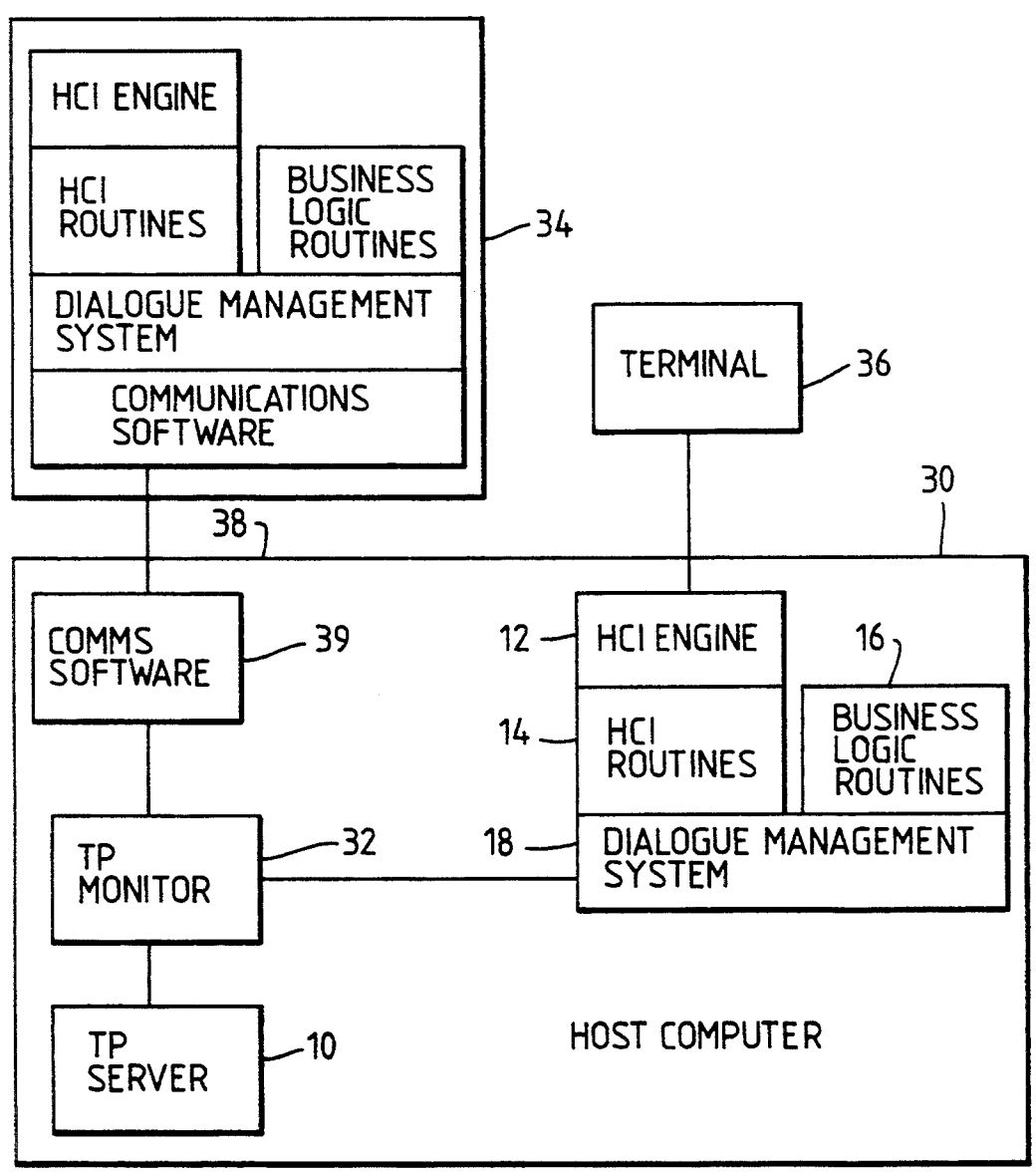
FIG. 3 is a block diagram showing the location of the software components with respect to the hardware of the system.

Referring to FIG. 3, this shows the locations of the various software components of FIG. 1 in a typical hardware system.

The hardware system comprises a host computer 30 which in this example may be an ICL DRS 6000 system (DRS 6000 is a trademark of International Computers Ltd), running under the UNIX operating system. The host computer runs the transaction processing (TP) services under a TP monitor 32. In this example, the TP monitor is the TUXEDO software, supplied by Unix System Laboratories. UNIX and TUXEDO are trademarks of UNIX System Laboratories Inc).

The system can be accessed by users by way of one or more personal computer (PC) workstations 34, or by way of one or more video terminals (VT) 36, or by a combination of these.

The PC workstation 34 may, for example, be an ICL M55 personal computer, running the MS-DOS operating system (MS-DOS is a trademark of Microsoft Corporation). The workstation is linked to the host computer by way of a communications link 38, with suitable communications software 39 at both ends.

In the case of a PC workstation, the HCI engine, HCI routines, business logic routines, and DMS all reside in the PC itself and run under the PC operating system. In the case of a video terminal on the other hand, all these components reside in the host computer.

Referring now to FIG. 4, this shows the DMS in more detail, and its relationship with the client application code 40 (i.e. the HCI routines and business logic routines).

As already described, the DMS has a set of inventory types 41 available to it, from which it can create inventory instances 42 as required. The DMS also maintains an event queue 44 holding notify, request, completed, signal, created and deleted events.

The DMS comprises a number of routines as follows: CREATE routine 50, DELETE routine 52, SETVALUE routine 54, CLEAR routine 56, GETVALUE routine 58, CHECK routine 60, TPCALL routine 62, POLL routine 64 and TPPOLL routine 66. Each of these routines will be described in turn.

CREATE

The CREATE routine is invoked from the client application code when it is required to create an instance of an inventory of a specified inventory type. The inventory type is accessed, and is used as a template for creating a new instance of that inventory type. A create event is then generated, and placed in the event queue.

DELETE

The DELETE routine deletes a specified instance of an inventory. A delete event is added to the event queue.

SETVALUE

The SETVALUE routine is invoked to set a specified inventory item to a specified value. The item state is changed to SET. Then, if the notify event flag of the item is ON, a notify event is generated and placed in the event queue. This applies to all items that refer to the same physical data element.

CLEAR

The CLEAR routine clears the value of an item, and sets its state to UNSET. It also specifies whether a subsequent attempt to read the item while still in the UNSET state should generate a REQUEST event or a specified SIGNAL event. Then, if the notify event flag of the item is ON, a notify event is generated and placed in the event queue. This applies to all items that refer to the same physical data element.

GETVALUE

The GETVALUE routine is used to read the value of a specified item in a specified inventory.

First, the item is located, and its state is obtained. If the state is SET, the value of the item is copied into a specified location for use by the requesting client application code routine.

If, on the other hand, the state is UNSET, and the request or signal event flag of the item is ON, a request or signal event is generated and placed in the event queue. In addition, if an identity relationship has been declared between this item and any other items, those other items are also accessed and, if any has its request or signal event flag ON, a request or signal event is generated. It is expected that normally only one item at most of each set of items in an identity relationship will have its request or signal event flag ON, so that multiple requests or signals in respect of the set are avoided.

Finally, the GETVALUE routine returns the state of the item to the caller.

CHECK

The CHECK routine provides a mechanism for checking that all the items needed to perform some operation are in the SET state. For example, it may be used to check that all input parameters for a TP service request are present.

The routine scans through each item in a specified inventory in turn (using the GETVALUE routine), looking for items with the check flag ON. If the check flag is ON, and the item is in the pending state, the CHECK routine immediately returns with this failing item reference. If the end of the inventory is reached with no failures detected (i.e. all items with check flags ON are in the SET state), the CHECK routine returns a success indication to the caller; otherwise, it indicates the first item that was not SET and may generate a request or signal event.

TPCALL

The TPCALL routine is used for making TP service requests. Each call to the TPCALL routine specifies a required TP service, a request inventory, and a reply inventory. The request inventory indicates the inventory instance to be used as the source of the request data, while the reply inventory indicates the inventory instances to be used to receive the reply data from the TP service. The reply inventory may be the same as the request inventory.

TPCALL calls the TP monitor, requesting it to allocate a TP buffer. It then copies all the items from the request inventory into this buffer. Any items in the unset state will be given default values by the TP monitor. If, however, any item is found to be in the pending state, TPCALL terminates and returns an error indication to the caller.

Assuming that no such error has been produced, TPCALL then sets the state of each item in the reply inventory to "pending", to indicate that the item is waiting for a value to be returned by the TP service.

The routine then makes a call to the TP monitor to fire off the TP request asynchronously. The TP monitor will return a call descriptor identifying the call.

Finally, TPCALL sets up a new record in a chain of records referred to as the TP reply chain. This record contains the call descriptor, and also a pointer to the reply inventory, for use when the TP reply arrives.

POLL

The POLL routine provides a mechanism for handling the events in the event queue, and also for handling the receipt of asynchronous TP replies from the TP service. POLL is included in a central loop of the system, so that it is invoked periodically, at regular intervals.

The routine first scans through the events stored in the event queue. For each event in the queue, the POLL routine generates a call to an appropriate event routine in the client application code, to initiate any processing action resulting from the event. The event routine is passed parameters to enable it to distinguish the event type, the inventory type and instance, the inventory item, and if necessary the element number (for arrays of items) with which the event is concerned. In the case of a signal event, the signal type is also passed. The event routines may themselves generate further events and, if so, these further events are added to the event queue so that they will also be processed before the end of the scan.

When all the events in the queue have been processed, the TPPOLL routine checks to see whether there are any outstanding TP calls that have been produced by the TPCALL routine and have not yet received replies. Assuming that there is at least one outstanding TP call, POLL calls the TP monitor to allocate a TP buffer. It then calls the TP monitor to get the next outstanding TP reply, if any.

If a reply is returned, POLL then scans the TP reply chain, to find the appropriate reply inventory corresponding to the call descriptor. The TP buffer allocated by TPCALL when it made the request is freed at this stage. POLL then copies the reply data into the appropriate items of the reply inventory, and changes the state of each item to "set". When all the items in the reply inventory have been set, a notify event is generated for each item and added to the event queue.

In summary, it can be seen that the DMS provides an interface between the event driven client application code and the linear TP services. Furthermore, the DMS facilitates the separation of the client application code into HCI routines and business logic routines.

We claim:

1. A computer system comprising a first processing component, a second processing component, and dialogue management means for providing an interface between the first and second components, wherein the dialogue management means comprises:
   (a) means for maintaining an inventory, comprising a plurality of items,
   (b) means for enabling said first processing component to assign values to said items in said inventory,
   (c) means for checking whether a predetermined set of said items in said inventory have all had values assigned to them, and
   (d) means for enabling said second processing component to access said items in said inventory when said checking means indicates that said predetermined set of said items in said inventory have all had values assigned to them.

2. A system according to claim 1 wherein each item has a state value, and wherein an item is put into a set state when it has a value assigned to it, an unset state when it has no value assigned to it, and a pending state when it is waiting for a value to be supplied.

3. A system according to claim 2 wherein the dialog management means comprises an event queue, and wherein, when the value of an item is changed a notify event is added to the event queue and when the value of an item is required, but the item is currently unset, a request event is added to the event queue.

4. A system according to claim 3 wherein each item has a notify flag for selectively controlling whether a notify event is generated when the value of that item is changed.

5. A system according to claim 3 wherein each item has a request flag and a signal flag for selectively controlling whether a request or signal event is generated when the value of that item is requested but the item is currently unset.

6. A system according to claim 3 wherein the dialog management means comprises means for periodically polling the event queue and for initiating actions by the second processing component in response to events in the queue.

7. A system according to claim 2 wherein, whenever a processing operation is initiated by the first processing component, all items whose values are to be supplied by the data returned by the first processing component are put into the pending state.

8. A system according to claim 1 wherein said first component includes a transaction processing service.

9. A system according to claim 1 wherein said second component is a human-computer interface component.

10. A method of interfacing between first and second processing components in a computer system, the method comprising the steps:
    (a) maintaining an inventory, comprising a plurality of items,
    (b) operating said first processing component to assign values to said items in said inventory,
    (c) checking whether a predetermined set of said items in said inventory have all had values assigned to them, and
    (d) operating said second processing component to access said items in said inventory when said checking means indicates that said predetermined set of said items in said inventory have all had values assigned to them.

11. A method according to claim 10 including the further steps of:
    (a) maintaining at least one further inventory comprising a plurality of items,
    (b) storing a plurality of identity relationships indicating identity between items in said inventories,
    (c) when a value is assigned to a selected item in one of said inventories, also assigning that value to any other item which has an identity relationship with said selected item.

* * * * *